United States Patent
Chen et al.

(10) Patent No.: US 8,319,931 B2
(45) Date of Patent: Nov. 27, 2012

(54) STRUCTURE OF GATE DRIVER

(75) Inventors: Ming-Yeong Chen, Tainan (TW);
Yao-Hwei Lee, Tainan (TW); Shou Kai Chiu, Tainan (TW)

(73) Assignee: Himax Technologies Limited, Tainan (TW)

( * ) Notice: Subject to any disclaimer, the term of this patent is extended or adjusted under 35 U.S.C. 154(b) by 1048 days.

(21) Appl. No.: 11/534,389

(22) Filed: Sep. 22, 2006

(65) Prior Publication Data
US 2007/0182876 A1 Aug. 9, 2007

(30) Foreign Application Priority Data
Feb. 8, 2006 (TW) .............................. 95104271 A

(51) Int. Cl.
*G02F 1/1345* (2006.01)
(52) U.S. Cl. ....................................................... 349/151

(58) Field of Classification Search .................. 349/149, 349/151
See application file for complete search history.

(56) References Cited

U.S. PATENT DOCUMENTS

| | | | |
|---|---|---|---|
| 6,542,139 B1 * | 4/2003 | Kanno | 345/87 |
| 6,611,261 B1 | 8/2003 | Zhang et al. | |
| 2002/0047826 A1 * | 4/2002 | Akimoto et al. | 345/100 |
| 2005/0232045 A1 * | 10/2005 | Toba | 365/207 |

* cited by examiner

*Primary Examiner* — Mark Robinson
*Assistant Examiner* — Charles Chang
(74) *Attorney, Agent, or Firm* — Baker & McKenzie LLP

(57) ABSTRACT

Certain embodiment of the invention discloses a new gate driver structure suitable for TFT (Thin Film Transistor) display apparatuses, comprising a gate driver having at least one channel for outputting voltage signals; a switch circuit for controlling the outputted voltage signals from the gate driver; and a TFT substrate wherein the gate driver and the switch circuit are positioned on the substrate.

16 Claims, 4 Drawing Sheets

STRUCTURE OF GATE DRIVER

RELATED APPLICATIONS

This application claims priority to Taiwanese Patent Application No. 095104271 filed on Feb. 8, 2006 including the specification, claims, drawings and abstract. The disclosure of the above Taiwanese application is incorporated herein by reference in its entirety.

FIELD OF THE INVENTION

The present invention relates to a gate driver structure for a TFT (Thin Film Transistor) display apparatus and in particular, the invention relates to a new structure comprising only one gate driver.

BACKGROUND OF THE INVENTION

As multimedia age arrives, the resolution of a display apparatus becomes more important than ever. Generally, multimedia apparatuses, especially for video purposes, are divided into two groups. One group emits light actively and the other emits light passively. The active group includes CRT (Cathode Ray Tube) and LED (Light Emitting Diode). The passive group includes LCD (Liquid Crystal Display).

LCD technology is the main stream technology utilized in display apparatuses today. Its advantages include power saving and small dimensions when compare to the traditional CRT technology. It is well known to those skilled in the art that a colorful LCD display apparatus utilizes a LCD panel comprising a plurality of TFT transistors, a polarizer, and a light source for generating colorful images. TFT transistors can be used as controllers to control images on colorful display apparatus composed of red, green and blue pixels. To construct display or non-display status of display pixels in the specific area on a TFT panel, a driver circuit first controls a plurality of data signals. The driver circuit then scans signals to drive the pixels located in a specific area on the TFT panel. Finally, the driver circuit utilizes TFT transistors to activate the "on" state or "off" state of the pixels.

An active matrix LCD display utilizes a TFT substrate as a base to develop pixels and as a conjunction for driving current to pass by. Thus, it has the advantages of small dimensions and reduced manufacturing cost, e.g., PCB boards used for connection. The TFT substrate further comprises TFT transistors, each of which controls an LCD pixel. Each TFT transistor comprises a gate terminal coupled with a scan line, a source terminal coupled with a data line, and a drain terminal coupled with an anode of the LCD pixel. The cathode of the LCD pixel may be connected to ground. When the scan line is driven by a high voltage, the transistor is switched on. Then, the data line provides a specific voltage to the source terminal of the TFT transistor and then to the anode of the LCD pixel.

To drive the voltage of the data line into the LCD pixel for displaying images, the LCD display apparatus further comprises drivers whose main function is to output appropriate voltages into pixels to control the "twisting" of liquid crystal molecules. Generally, there are two types of drivers: one is a gate driver positioned along the X axis of the display apparatus and the other is a source driver positioned along the Y axis. The function of the source driver is to input data signals. The function of the gate driver is to twist the liquid crystal molecules.

Because of market demand, the resolution of LCD display apparatus needs to be better than ever. More gate drivers are needed to support high resolution LCD. For example, an LCD display apparatus with resolution 1366×768 requires three gate drivers; each contains two hundred and fifty six channels. Please refer to FIG. 1 which illustrates a gate driver structure for an LCD display apparatus in the prior art. The structure of the LCD display apparatus comprises a first gate driver 102, a second gate driver 104, a third gate driver 106, and a substrate 108 on which a plurality of TFT transistors is grown. The material of the substrate 108 may be glass or transparent insulating materials like polyester resin, polyimide etc. The first gate driver 102, positioned on a FPC (Flexible Printed Circuit Board) (not shown), is coupled to the substrate 108. The first gate driver 102 comprises a first pad (STV1) to receive a trigger voltage signal, and a two hundred and fifty six channels including a first channel D_CH1, a second channel D_CH2, a third channel D_CH3, . . . , and a two hundred and fifty sixth channel D_CH256. In addition, the gate driver 102 also outputs a trigger voltage signal from a second pad (STV2). By driving voltages via the first channel D_CH1, the second channel D_CH2, the third channel D_CH3, . . . , and the two hundred and fifty sixth channel D_CH256, to a first horizontal channel P_CH1, a second horizontal channel P_CH2, a third horizontal channel P_CH3, . . . , and a two hundred and fifty sixth horizontal channel P_CH256, on the substrate 108 respectively, there will be two hundred and fifty six horizontal outputs from the gate driver 102. Similarly, a second gate driver 104 comprises a first pad (STV1) to receive a trigger voltage signal, and a two hundred and fifty six channels including a two hundred and fifty seventh channel D_CH257, a two hundred and fifty eighth channel D_CH258, a two hundred and fifty ninth channel D_CH259, . . . , and a five hundred and twelfth channel D_CH512. Furthermore, the gate driver 104 outputs another trigger voltage signal from a second pad (STV2). By driving voltages via the two hundred and fifty seventh channel D_CH257, the two hundred and fifty eighth channel D_CH258, the two hundred and fifty ninth channel D_CH259, . . . , and the five hundred and twelfth channel D_CH512, to a two hundred and fifty seventh horizontal channel P_CH257, a two hundred and fifty eighth horizontal channel P_CH258, a two hundred and fifty ninth horizontal channel P_CH259, . . . , and a five hundred and twelfth horizontal channel P_CH512, on the substrate 108 respectively, there are additional two hundred and fifty six horizontal outputs from the gate driver 104. The third gate driver 106 also performs a similar function. A second gate driver 106 comprises a first pad (STV1) to receive a trigger voltage signal and a two hundred and fifty six channels including a five hundred and thirteenth channel D_CH513, a five hundred and fourteenth channel D_CH514, a five hundred and fifteenth channel D_CH515, . . . , and a seven hundred and sixty eighth channel D_CH768. The gate driver 106 outputs another trigger voltage signal from a second pad (STV2). By driving voltages via the five hundred and thirteenth channel D_CH513, the five hundred and fourteenth channel D_CH514, the five hundred and fifteenth channel D_CH515, . . . , and the seven hundred and sixty eighth channel D_CH768, to a five hundred and thirteenth horizontal channel P_CH513, a five hundred and fourteenth horizontal channel P_CH514, a five hundred and fifteenth horizontal channel P_CH515, . . . , and a seven hundred and sixty eighth horizontal channel P_CH768, on the substrate 108 respectively, there are another two hundred and fifty six horizontal outputs from the gate driver 106.

In effect, the demands for higher resolution on LCD display increases the number of gate drivers required, and raises the costs and inefficiencies in the manufacturing processes.

SUMMARY OF THE INVENTION

The purpose of the present invention is to solve some of the disadvantages in the prior arts. According to the invention, a gate driver structure suitable for TFT display apparatuses that 1) decreases the number of gate drivers used; 2) enhances the reusability of the gate driver; and 3) reduces the on-chip area of the gate driver, is disclosed in order to achieve the stringent requirements on the cost and manufacturing efficiency of LCD displays.

A gate driver structure described in one embodiment of the invention comprises a gate driver having at least one channel to output voltage signals; a switch circuit to control the voltage signals outputted from the gate driver; and a substrate wherein the gate driver and the switch circuit are manufactured on the substrate. Another embodiment of the invention discloses a gate driver structure comprises a gate driver having at least one channel to output voltage signals; a switch circuit to control the voltage signals outputted from the gate driver; a substrate wherein the gate driver and the switch circuit are manufactured on the substrate; and a switch controller to control the transmission of the voltage signals outputted from the gate driver.

BRIEF DESCRIPTION OF THE DRAWINGS

Various objects and advantages of the present invention will be more readily understood from the following description when read in conjunction with the appended drawings, in which.

DESCRIPTION OF EMBODIMENTS OF THE INVENTION

One embodiment of the present invention provides a gate driver structure for an LCD display apparatus. According to the gate driver structure of the invention, the number of gate drivers used is reduced, the reusability of the gate driver is increased, and the chip area of the gate driver is smaller. Accordingly, a gate driver structure with low cost and efficient manufacturing processes is achieved. The following descriptions are for illustration only so that certain embodiments and applications of the invention can be more easily understood. However, it is possible to make modifications and changes to these embodiments without departing from the scope of the annexed claims.

Figure 1:
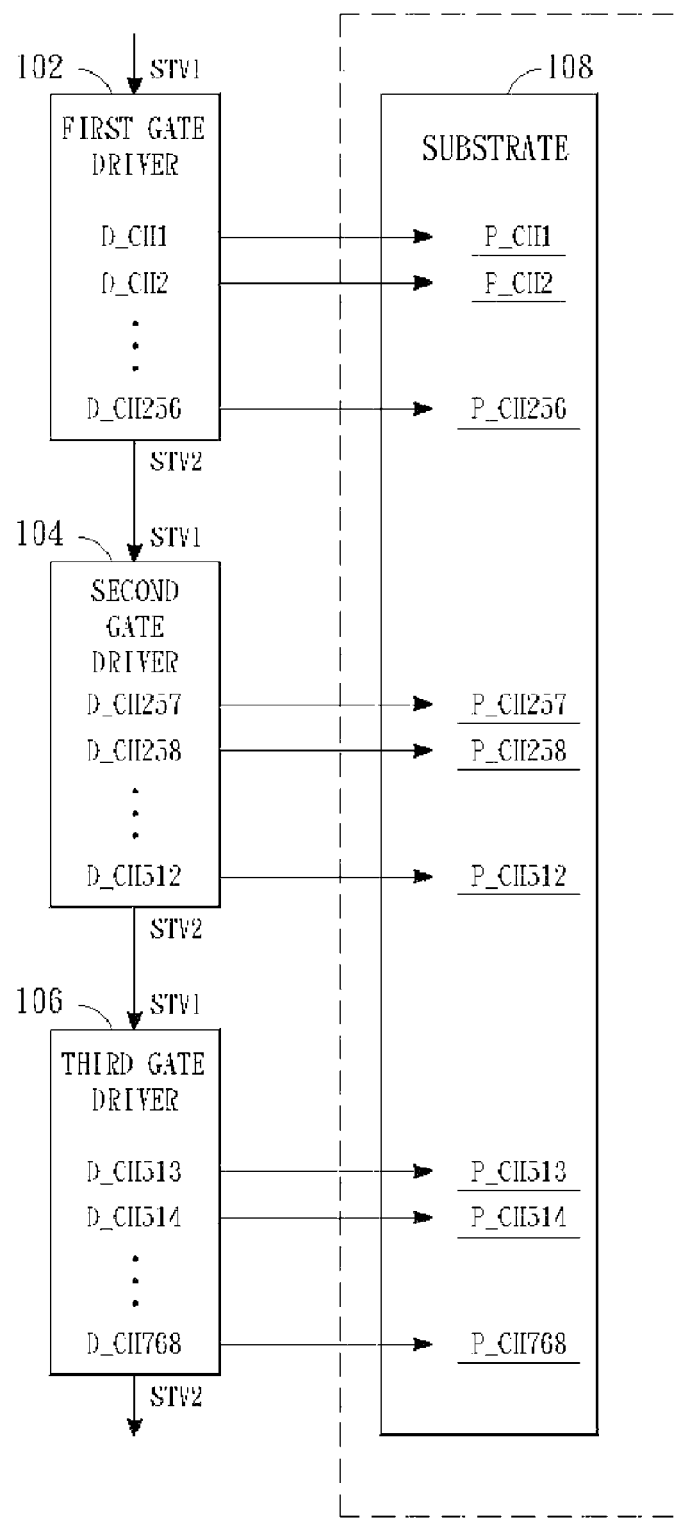
FIG. 1 illustrates a gate drivers structure of an LCD display apparatus in the prior art.
Figure 2:
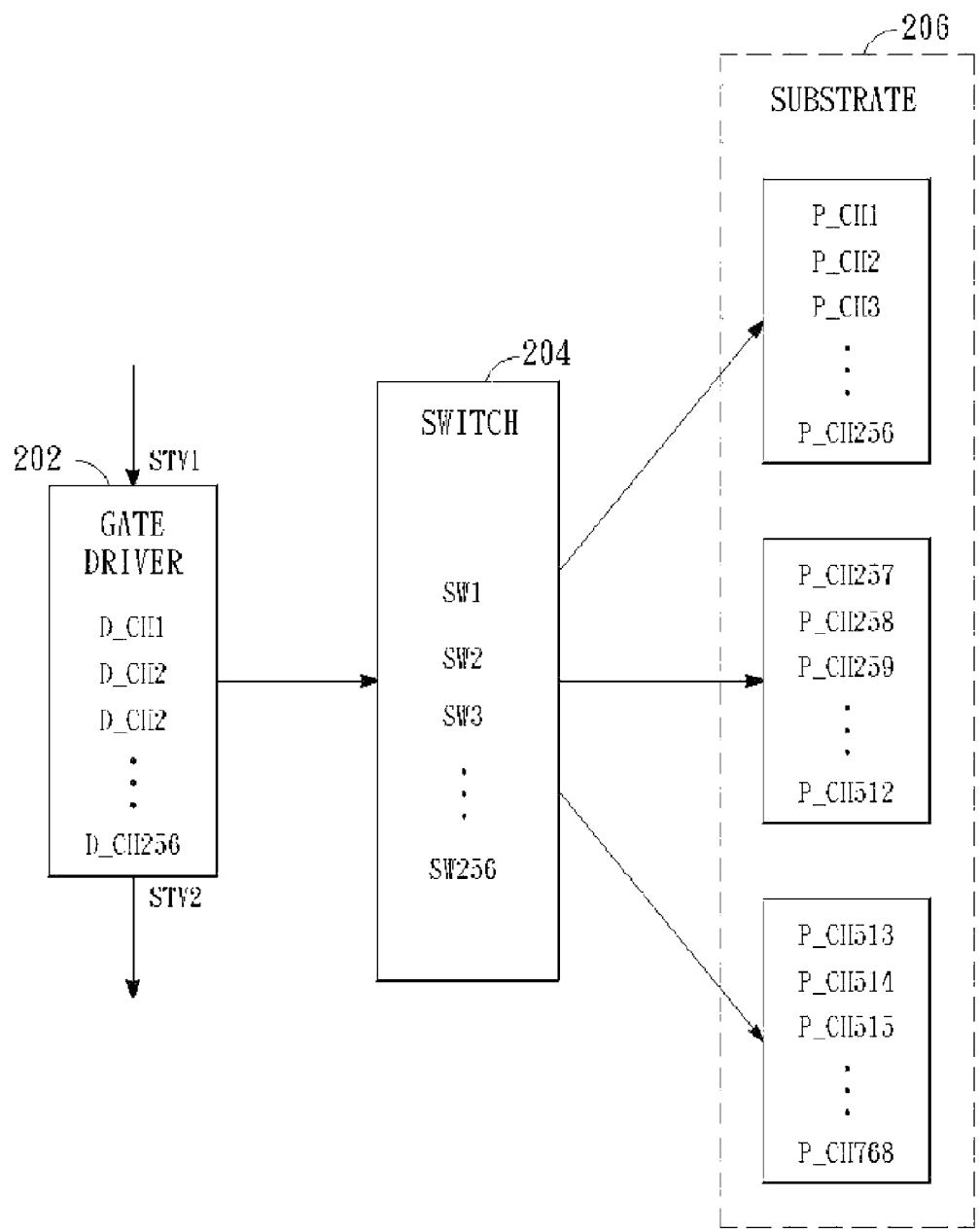
FIG. 2 shows a gate driver structure for an LCD display apparatus according to one embodiment of the invention.

FIG. 2 shows a gate driver structure for an LCD display apparatus according to one embodiment of the invention. The gate driver structure comprises a gate driver 202, a switch circuit 204, and a substrate 206 wherein the material of the substrate 206 can be glass or transparent insulating materials like polyester resin, polyimide etc. The switch circuit 204 can be positioned on the substrate 206. A voltage signal triggers gate driver 202 via a first pad (STV1). In one embodiment, there are 256 channels on the gate driver which includes a first channel D_CH 1, a second channel D_CH2, a third channel D_CH3, . . . , and a two hundred and fifty sixth channel D_CH256. Furthermore, the gate driver 202 outputs a voltage signal from a second pad (STV2). The switch circuit 204 can comprise a plurality of switch elements. In one embodiment, the number of switch elements can be equivalent to the number of channels in the gate driver 202 such that each channel corresponds to one switch element. These switch elements are controlled by a same control signal. The switching frequency of the switch elements is relatively low so that any issue resulting from the limited electronic mobility of the substrate 206. is eliminated.

Specifically, in one embodiment of the invention, each of the channels D_CH1~_CH256 corresponds to one of the 256 switch elements of the switch circuit 204. The switch elements may comprise a first switch element SW1, a second switch element SW2 . . . a two hundred and fifty fifth switch element SW255, and a two hundred and fifty sixth switch element SW256. The outputs of the gate driver 202 are sent to the substrate 206 through the switch elements, each of which selects one path for transferring the received output of the gate driver 202 to one of the three groups on the substrate 206. The selection is repeated for each group. The frequency of selections is determined by dividing the number of channels in the substrate 206 by the number of channels on gate driver 202. For example, the frequency of selections may be three if the number of channels in the gate driver 202 is 256, and the number of channels in the substrate 206 is 768. Various methods can be used to implement the switch circuit 204 and one of them is described below.

FIG. 2 shows an implementation of the switch circuit 204. The switch circuit 204 transfers a first voltage signal of the channel D_CH1 to the first horizontal channel P_CH1, a second voltage signal of the channel D_CH2 to the second horizontal channel P_CH2, . . . , and a two hundred and fifty sixth voltage signal of D_CH256 to the two hundred and fifty sixth horizontal channel P_CH256. After a first scan, the switch circuit 204 transfers another first voltage signal of the channel D_CH1 to the two hundred and fifty seventh horizontal channel P_CH257, another second voltage signal of the channel D_CH2 to P_CH258, . . . , and another two hundred and fifty sixth voltage signal of the channel D_CH256 to P_CH512. After this second scan, the switch circuit 204 transfers still another first voltage signal of the channel D_CH 1 to P_CH513, another second voltage signal of the channel D_CH2 to P_CH514, . . . , and another two hundred and fifty sixth voltage signal of the channel D_CH256 to P_CH768.

Figure 3:
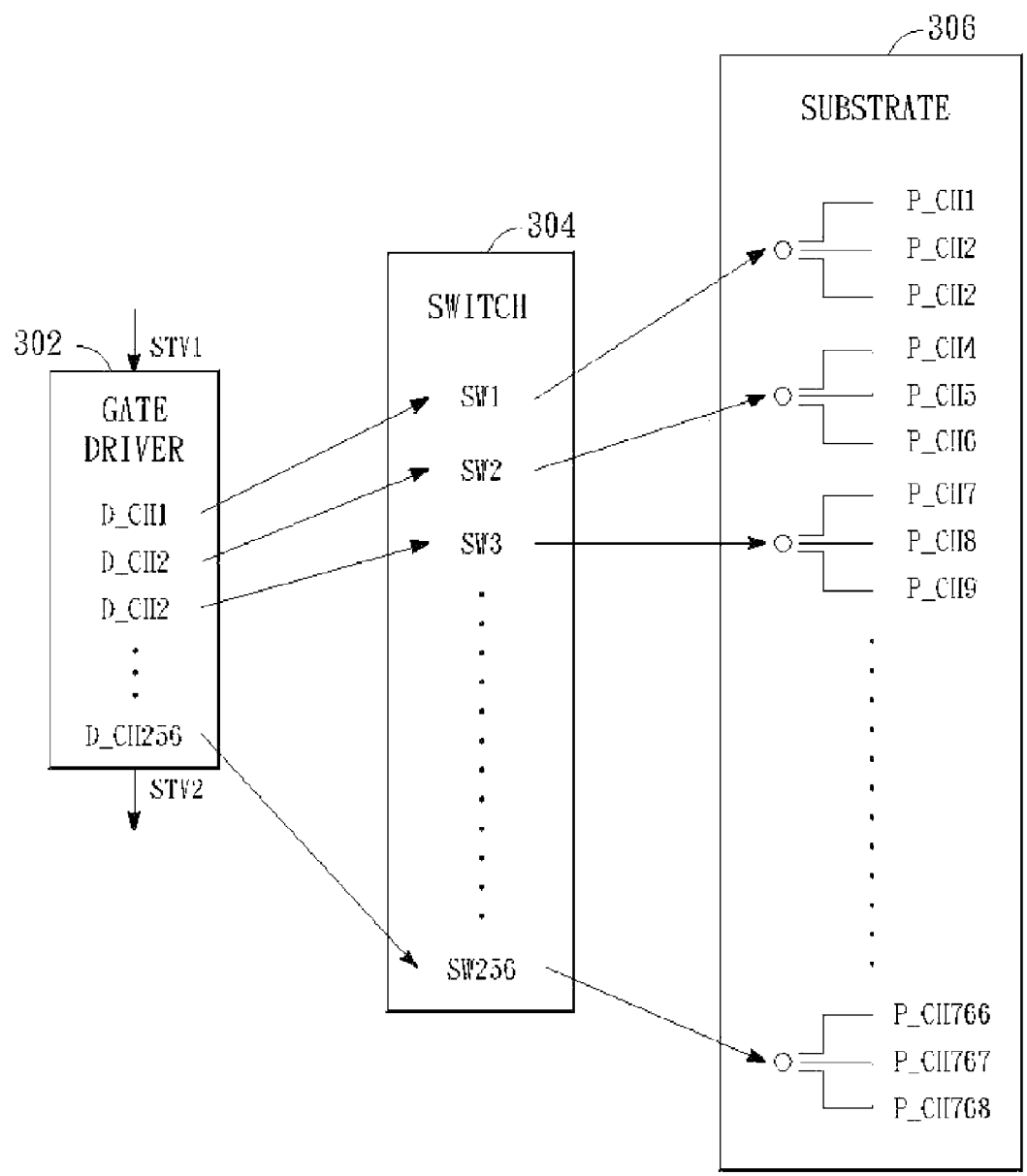
FIG. 3 shows a gate driver structure for an LCD display apparatus according to another embodiment of the invention.

FIG. 3 demonstrates a gate driver structure according to another embodiment of the invention. In this embodiment, a gate driver structure comprises a gate driver 302, a switch circuit 304, and a substrate 306 wherein the material of the substrate 306 can be glass or transparent insulating materials like polyester resin, polyimide etc. A voltage signal triggers the gate driver 302 via a first pad (STV1). Here, the gate driver 302 comprises two hundred and fifty six channels including a first channel D_CH1, a second channel D_CH2, a third channel D_CH3, . . . , and a two hundred and fifty sixth channel D_CH256. Furthermore, the gate driver 302 outputs a voltage signal from a second pad (STV2). In addition, the switch circuit 304 comprises a plurality of switch elements. These switch elements can be arranged in cascade and controlled sequentially by a specific voltage signal. When this embodiment is in operation, the switching speed of the switch elements may not be fast. However, the electronic mobility on the substrate 306 is still sufficient to support such switching speed.

FIG. 3 also shows an implementation of the switch circuit 304. The channels of the gate driver 302, including the first channel D_CH1, the second channel D_CH2, the third channel D_CH3, . . . , and the two hundred and fifty sixth channel D_CH256, correspond respectively to the two hundred and fifty six switch elements of the switch circuit 304 which comprises a first switch element SW1, a second switch element SW2, . . . , a two hundred and fifty fifth switch element SW255, and a two hundred and fifty sixth switch element SW256. Moreover, each switch element controls the three adjacent, contiguous horizontal channels in the substrate 306. The first switch element SW1 controls a first horizontal channel P_CH1, a second horizontal channel P_CH2, and a third horizontal channel P_CH3; the second switch element SW2 controls a fourth horizontal channel P_CH4, a fifth horizontal channel P_CH5 and a sixth horizontal channel P_CH6; . . . ; and the two hundred and fifty sixth switch element SW256 controls P_CH766, P_CH767, and P_CH768. There are other methods to drive the horizontal channels on the substrate that can be implemented without departing from the scope of the invention. For example, it is possible to use the first switch element SW1 to control the first horizontal channel PCH_1, the third horizontal channel PCH_3 and the fifth horizontal channel PCH_5 and so forth.

Figure 4:
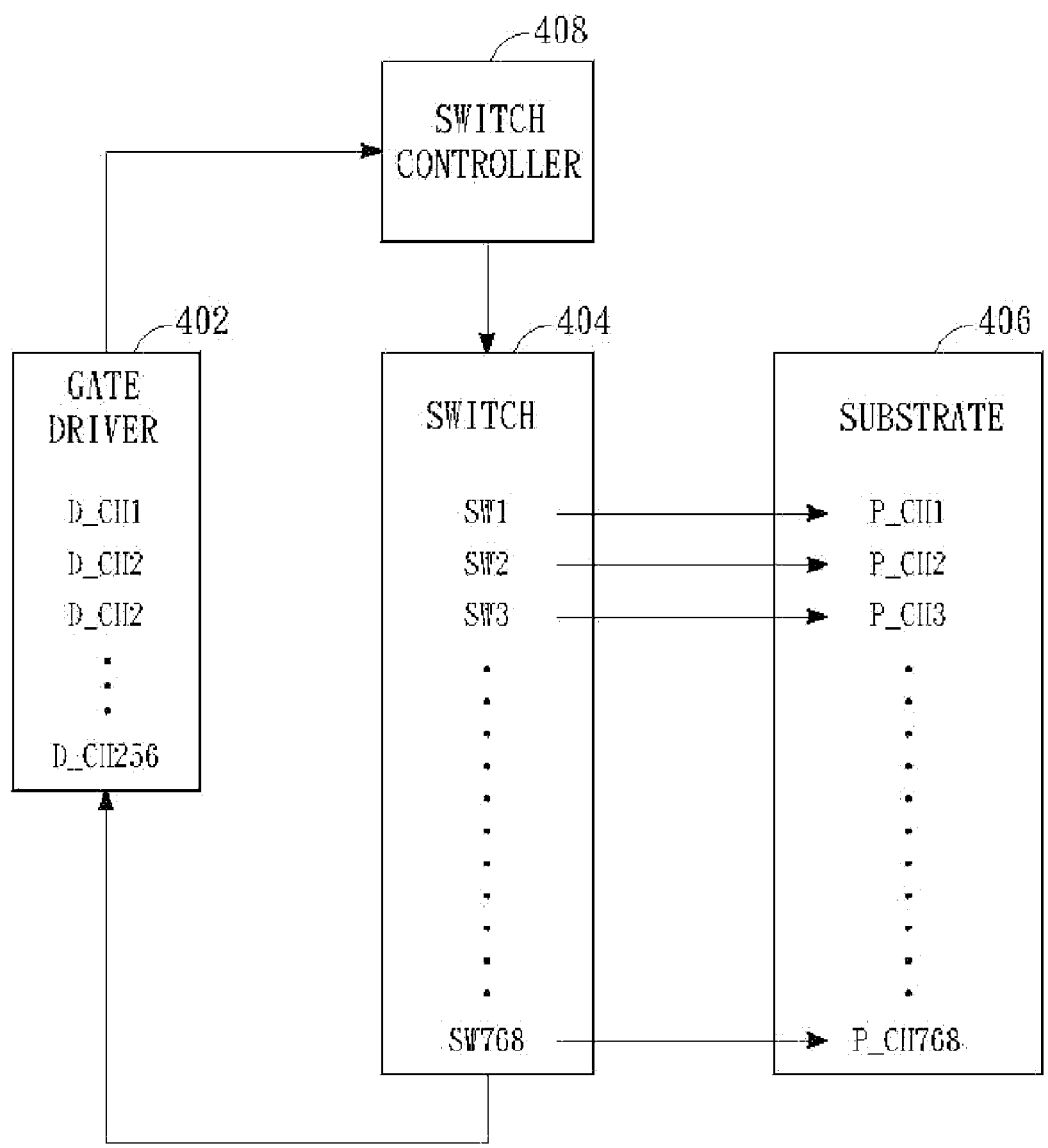
FIG. 4 shows a gate driver structure for an LCD display apparatus according to another embodiment of the invention.

FIG. 4 illustrates a gate driver structure for an LCD display apparatus according to another embodiment of the invention. In this embodiment, a gate driver structure comprises a gate driver 402, a switch circuit 404, a substrate 406, and a switch controller 408. The material of the substrate 406 can be glass or transparent insulating materials like polyester resin, polyimide etc. The switch controller 408 is developed on the substrate 406. A voltage signal triggers the gate driver 402 via a first pad (STV1). Here, there are two hundred and fifty six channels that comprises a first channel D_CH1, a second channel D_CH2, a third channel D_CH3, . . . , and a two hundred and fifty sixth channel D_CH256. Furthermore, the gate driver 402 outputs a voltage signal from a second pad (STV2). The switch circuit 404 comprises a plurality of switch elements. The number of switch elements is three times the number of channels in the gate driver 402, which means that there are seven hundred and sixty eight switch elements. These switch elements can be arranged in cascade and controlled sequentially by a voltage signal. When this embodiment is in operation, the switching speed of the switch elements may be slow. However, the electronic mobility on the substrate 406 is still sufficient to support such switching speed.

An implementation of the switch circuit 404 is shown in FIG. 4. The outputs of the channels in the gate driver 402, including the first channel D_CH1, the second channel D_CH2, the third channel D_CH3 . . . and the two hundred and fifty sixth channel D_CH256, are controlled by the switch controller 408. The switch controller 408 is coupled to the switch circuit 404, which comprises seven hundred and sixty-eight switch elements, each of which is connected to a single channel. The switch controller 408 uses at least one control signal to control the switch circuit 404. Moreover, each switch element drives one horizontal channel of the substrate 406. For example, a first switch element SW1 drives a first horizontal channel P_CH1, a second switch element SW2 drives a second horizontal channel P_CH2, . . . , a seven hundred and sixty seventh switch element SW767 drives a P_CH767, and a seven hundred and sixty eighth switch element SW768 drives a P_CH768.

It should be noted that the embodiments described herein are not limitations of the present invention, but exemplary descriptions. Indeed, other adaptations that are apparent to those skilled in the art but not described herein can still fall within the scope of the annexed claims.

What is claimed is:

1. A gate driver structure for an LCD apparatus, comprising:
   a substrate comprising a first plurality of channels associated with rows of pixels;
   a gate driver comprising a second plurality of channels, each of the second plurality of channels configured to output a voltage signal, wherein the number of channels in the first plurality of channels is a multiple of the number of channels in the second plurality of channels and the number of channels in the second plurality of channels is smaller than the number of channels in the first plurality of channels; and
   a switch circuit comprising a plurality of switch elements that receive the voltage signals and sequentially transfer the voltage signals to the first plurality of channels, wherein each of the plurality of switch elements has a plurality of outputs, each of the second plurality of channels being connected in parallel through one of the plurality of switch elements with one distinct channel selected among the first plurality of channels.

2. The gate driver structure for an LCD apparatus of claim 1, wherein the number of channels in the first plurality of channels is 768, and wherein the number of channels in the second plurality of channels is 256.

3. The gate driver structure for an LCD apparatus of claim 1, wherein said switch circuit is located on said substrate.

4. The gate driver structure for an LCD apparatus of claim 1, wherein each of the plurality of switch elements is configured to sequentially transfer the voltage signals to one or more group of channels included in the first plurality of channels, and wherein the number of channels in each group is equal to the number of channels included in the second plurality of channels.

5. The gate driver structure for an LCD apparatus of claim 1, wherein the plurality of switch elements are controlled by a same control signal.

6. The gate driver structure for an LCD apparatus of claim 1, wherein the material of said substrate is a glass or transparent insulating material.

7. The gate driver structure for an LCD apparatus of claim 1, wherein a number of switch elements included in the plurality of switch elements is equal to the number of channels included in the second plurality of channels, and wherein the outputs of each of the plurality of switch elements are connected to a number of continuous channels included in the first plurality of channels, and wherein the number of continuous channels is equal to the number of outputs.

8. The gate driver structure for an LCD apparatus of claim 1, wherein the pixels are connected with the first plurality of channels via transistors that are operatively switched by the voltage signals outputted by the gate driver.

9. A gate driver structure for an LCD apparatus, comprising:
   a substrate comprising a plurality of channels associated with rows of pixels, wherein the plurality of channels on the substrate includes at least a first plurality of channels and a second plurality of channels;
   a gate driver comprising a third plurality of channels, each of the third plurality of channels configured to output a voltage signal; and
   a switch circuit comprising a plurality of switch elements, wherein each of the plurality of switch elements is operable to transfer in parallel one voltage signal received from one of the third plurality of channels to a channel selected among either the first plurality of channels or the second plurality of channels.

10. The gate driver structure for an LCD apparatus of claim 9, wherein a number of channels in the third plurality of channels is less than a total number of channels in the plurality of channels on the substrate.

11. The gate driver structure for an LCD apparatus of claim 9, wherein a total number of channels in the plurality of channels on the substrate is a multiple of the number of channels in the third plurality of channels.

12. The gate driver structure for an LCD apparatus of claim 9, wherein the number of channels in the third plurality of channels is equal to the number of channels in each of the first and second pluralities of channels.

13. The gate driver structure for an LCD apparatus of claim 9, wherein the plurality of switch elements are controlled by a same control signal.

14. The gate driver structure for an LCD apparatus of claim 9, wherein a number of switch elements included in the plurality of switch elements is equal to the number of channels included in the third plurality of channels.

15. The gate driver structure for an LCD apparatus of claim 9, wherein the material of the substrate is a glass or transparent insulating material.

16. The gate driver structure for an LCD apparatus of claim 9, wherein the pixels are connected with the plurality of channels on the substrate via transistors that are operatively switched by the voltage signals outputted by the gate driver.

* * * * *